Oct. 17, 1944.   A. J. BROWN   2,360,470
GANTRY CRANE FOR SERVICING, LOADING, AND UNLOADING AIRCRAFT
Filed July 2, 1943   3 Sheets-Sheet 3
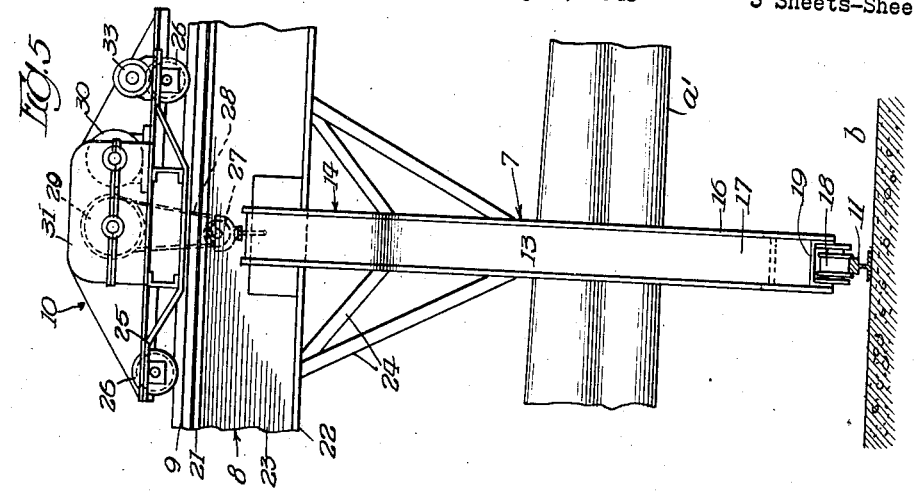
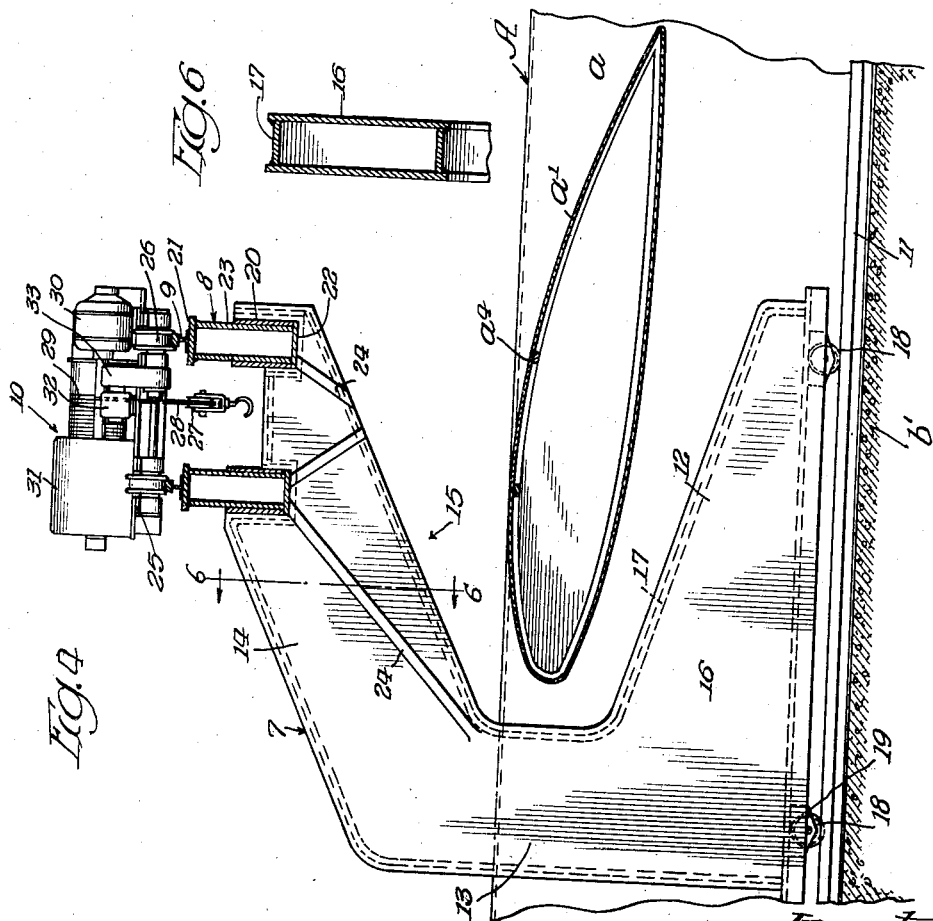
Inventor
Arthur J. Brown
By Fred Gerlach Atty Patented Oct. 17, 1944

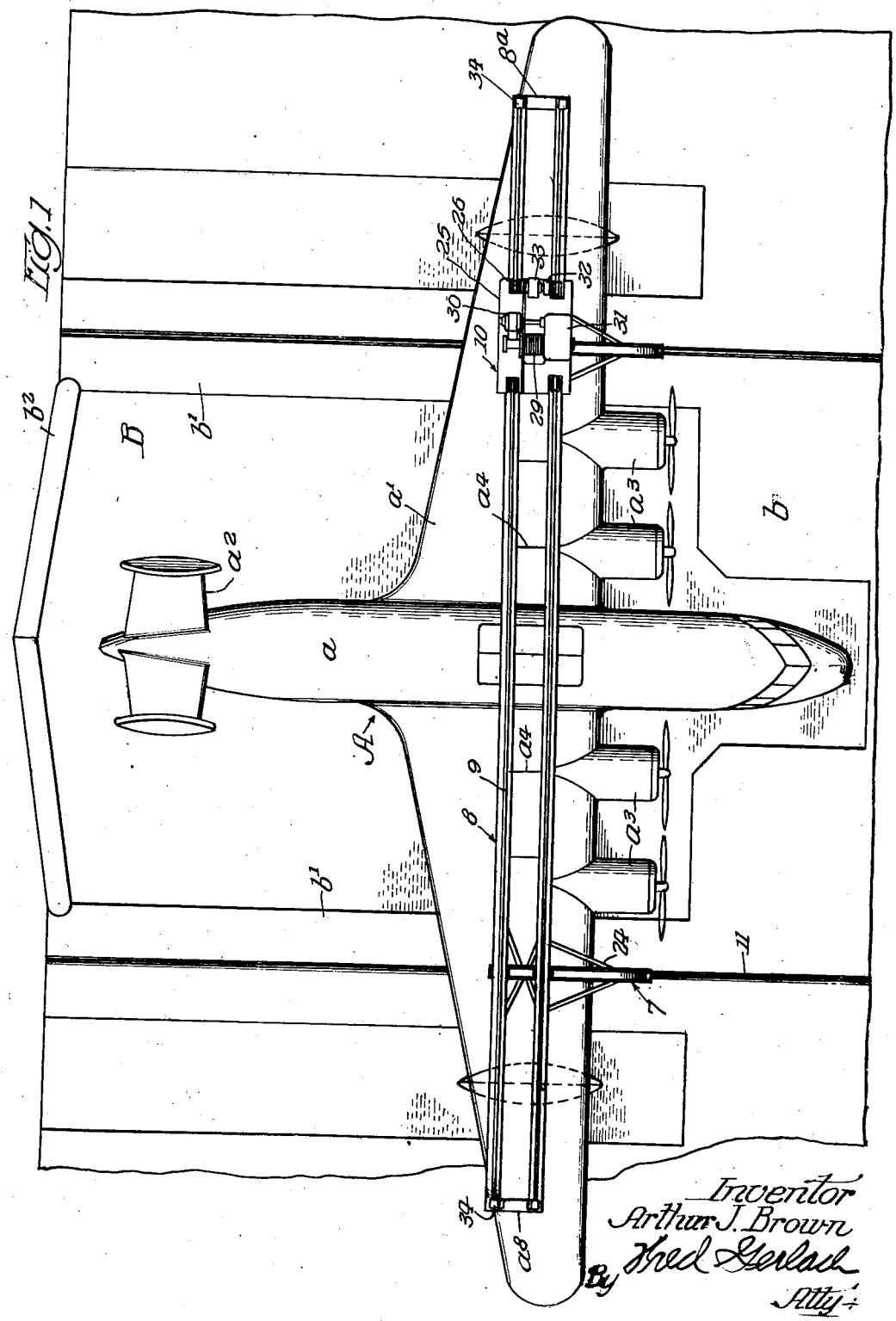

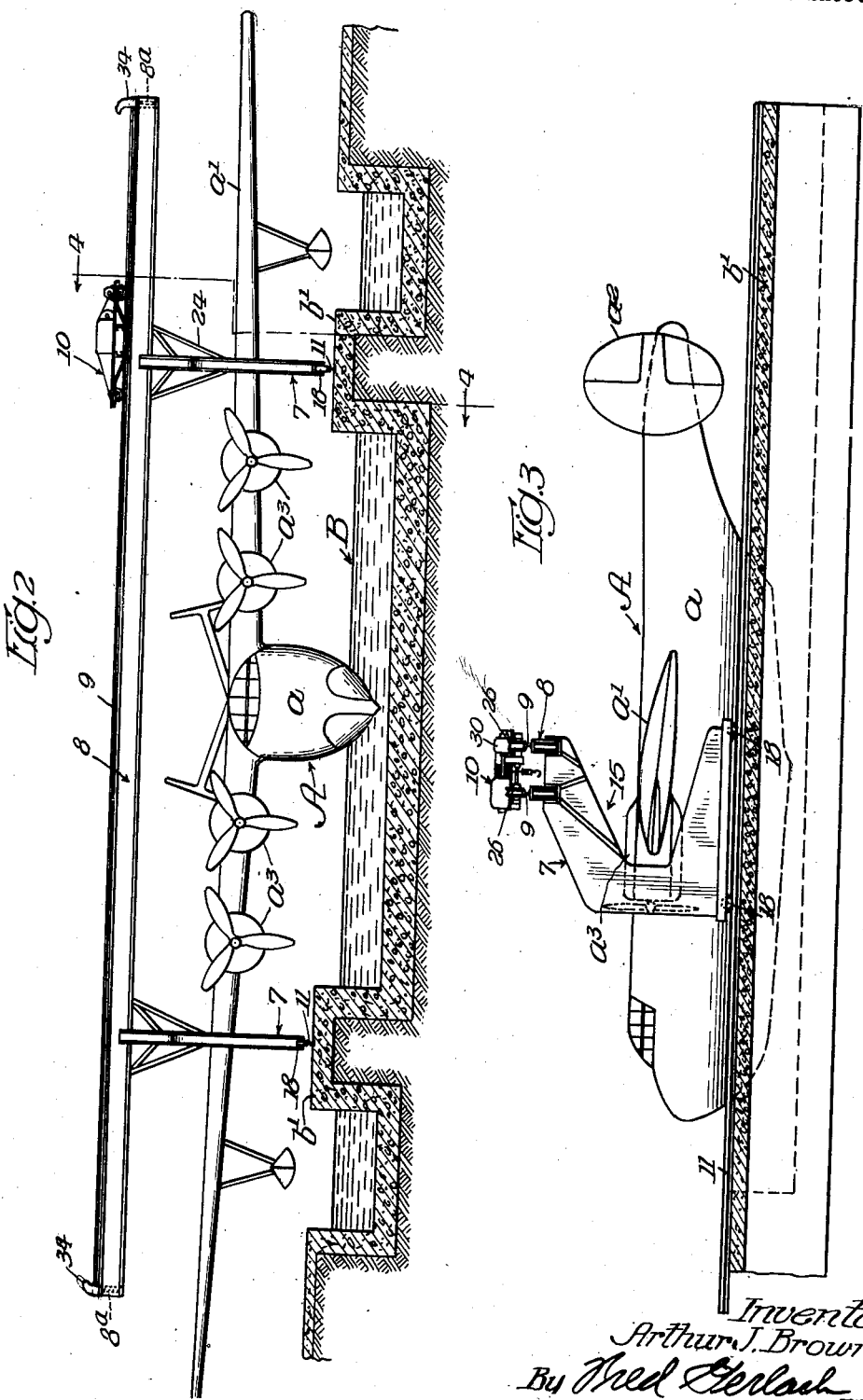

2,360,470

UNITED STATES PATENT OFFICE 2,360,470

GANTRY CRANE FOR SERVICING, LOADING, AND UNLOADING AIRCRAFT

Arthur J. Brown, Chicago, Ill., assignor to Whiting Corporation, Harvey, Ill., a corporation of Illinois Application July 2, 1943, Serial No. 493,202

7 Claims. (Cl. 212—14)

The present invention relates generally to cranes. More particularly the invention relates to that type of crane which is known as a gantry crane and comprises a pair of spaced apart upstanding legs and a pair of parallel horizontally extending rails which are connected to the upper ends of the legs and form an overhead track for a trolley with hoisting means thereon.

One object of the invention is to provide a crane of this type which is designed expressly for use in servicing, loading and unloading large sized airplanes and is characterized by the fact that the legs are disposed inwardly of the ends of the track-forming rails, are C-shaped in order to provide open sided pockets for receiving and accommodating the outer portions of the wing of the airplane to be serviced, loaded or unloaded, and have the rails mounted on the free or outer ends of the upper parts thereof so that when the crane and airplane are in operative relation the rails overlie the wing of the airplane and hence the trolley may be used to load or unload storage compartments in the wing as well as in the central portion of the body or fuselage of the airplane. By employing legs of this character the crane may be made extremely light in weight, is capable of being easily handled, and permits airplane servicing, loading and unloading operations to be accomplished or carried out efficiently and economically.

Another object of the invention is to provide a gantry crane which is generally of new and improved construction, effectively and efficiently fulfills its intended purpose and includes a novel mounting for the track-forming rails on the outer or free ends of the upper parts of the C-shaped legs.

A further object of the invention is to provide a gantry crane of the type and character under consideration in which each of the C-shaped legs is formed of a pair of side by side, spaced apart, similarly shaped plates and has flanged wheels at its lower part for travel on a ground rail that is normal to the trolley supporting rails.

Other objects of the invention and the various advantages and characteristics of the present gantry crane will be apparent from a consideration of the following detailed description.

The invention consists in the several novel features which are hereinafter set forth and are more particularly defined by claims at the conclusion hereof.

In the drawings which accompany and form a part of this specification or disclosure and in which like letters and numerals of reference denote corresponding parts throughout the several views:

Figure 1 is a plan view showing a gantry crane embodying the invention in operative relation with a large sized airplane of the flying boat type;

Figure 2 is a side view of the crane;

Figure 3 is an end view illustrating in detail the manner in which the C-shaped legs of the crane receive and accommodate the outer portions of the wing of the airplane and support the rails so that the trolley overlies the wing of the airplane;

Figure 4 is an enlarged vertical transverse section taken on the line 4—4 of Figure 2 and showing the manner in which the trolley supporting rails are mounted on the outer or free ends of the upper parts of the C-shaped legs;

Figure 5 is an enlarged front view of one of the legs of the crane; and

Figure 6 is a section on the line 6—6 of Figure 4.

The gantry crane which is shown in the drawings constitutes the preferred form or embodiment of the invention. It is illustrated in connection with an airplane A of the flying boat type and serves as a medium for carrying out airplane servicing, loading and unloading operations. The airplane A is shown as being moored in a mooring basin B and is of conventional design. It comprises a hull type body or fuselage $a$ having a transversely extending high wing $a^1$ at its central portion and an empennage $a^2$ at its rear end. The wing $a^1$ has the central portion thereof joined to the upper central portion of the body $a$ and carries along its leading portion 4 power units $a^3$ in the form of propellers and internal combustion engines. It serves as the main supporting surface for the airplane A and has storage compartments which are accessible by way of hatch or door closed openings $a^4$ in its upper surface. The basin B is defined by a U-shaped wall structure comprising a crosswall $b$ and a pair of parallel, laterally spaced side walls $b^1$. The latter project in one direction from the ends of the crosswall $b$ and have gates $B^2$ at their outer ends for closing the basin B. The upper surfaces of the side walls $b^1$ are flat and extend horizontally. When the airplane A is to be serviced, loaded or unloaded the gates $b^2$ are opened and the airplane is then propelled into the basin into a position wherein the body or fuselage $a$ faces the crosswall $b$ and is in centered and parallel relation with the side walls $b^1$, and the outer portions of the wing $a^1$ overlie and extend transversely across the inner ends of said side walls $b^1$.

The improved gantry crane comprises a pair of upstanding laterally spaced parallel legs 7, a pair of parallel, horizontally extending box girders 8, a pair of track-forming rails 9 on the box girders, and a trolley 10. It is supported by, and adapted to travel on, a pair of laterally spaced, parallel ground rails 11 in order that it may be shifted into and out of operative relation with the airplane A. The rails 11 are mounted on, and extend lengthwise of, the side walls $b^1$ of the basin defining wall structure. The inner ends of the rails, as shown in Figure 1, are extended and project across the crosswall $b$ of the wall structure in order that the crane may be shifted completely away from the airplane.

The legs 7 are disposed in parallel relation and are cross connected by the girders 8. They overlie, and extend lengthwise of, the rails 11 and are C-shaped so far as contour or configuration is concerned. As best shown in Figures 3 and 4 the legs 7 comprise horizontally elongated lower parts 12, vertically extending connecting parts 13, and horizontally elongated upper parts 14. The vertically extending connecting parts 13 extend between and serve to connect the inner ends of the lower and upper parts 12 and 14. The latter define with the connecting parts 13 open sided wedge shaped pockets 15 for receiving and accommodating the outer portions of the wing $a^1$ of the airplane A when the crane is shifted into its operative position with respect to the airplane, as shown in Figures 1 to 4, inclusive. When the crane is in its operative position the lower and upper parts of the legs straddle the outer portions of the airplane wing $a^1$. Each of the legs 7 comprises a pair of parallel, laterally spaced, plate metal C-shaped plates 16 and these are marginally united or joined together by way of spacer strips 17. The latter extend between, and are welded to, the marginal portions of the plates 16, as shown in Figure 6. The inner and outer ends of the lower parts 13 of the legs are provided with double flanged wheels 18 and these are adapted to ride on the rails 11 and support the crane so that it is shiftable along the rails 11 to and from the airplane A. The pockets 15 in the legs face or open outwards in order to permit the legs to be brought into straddled relation with the outer portions of the wing $a^1$ of the airplane A when the crane is shifted outwards along the rails 11. The wheels 18 are carried by spindle equipped brackets 19 which, as shown in Figure 5, are disposed between the leg forming plates 16.

The box girders are disposed in laterally spaced relation and extend transversely of the legs 7. They are mounted in U-shaped notches 20 in the upper portions of the outer or free ends of the upper parts 15 of the legs and are substantially as long as the wing $a^1$ of the airplane A. Each of the girders comprises a top plate 21, a bottom plate 22, and a pair of side plates 23. Such plates are preferably welded together. The ends of the girders 8 project an appreciable distance beyond the legs 7, as shown in Figures 1 and 2, and are cross connected or tied together by transversely extending beams $8^a$. The portions of the girders which fit within the U-shaped notches 20 are welded or otherwise fixedly secured in place in order that the legs and girders are in rigid or fixed relation. The rails 9 are mounted on, and extend lengthwise of, the box girders 8. They are the same in length as the girders and are welded or otherwise fixedly secured to the top plates 21 of the girders. As shown in Figures 1 and 2, the rails and girders are coterminous and the rails are spaced laterally apart by the girders and form an overhead track for the trolley 10. Such track permits the trolley to be shifted lengthwise of the airplane wing in connection with use of the crane. Outwardly extending diagonal braces 24 extend between the upper parts 14 of the C-shaped legs 7 and the bottom plates 22 of the box girders 8 and serve as reenforcing struts for the girders.

The trolley 10 is of conventional or standard design and comprises a rectangular frame 25 having double flanged wheels 26 at its corners. The wheels engage the rails 9 and serve to support the trolley so that it is bodily shiftable along such rails. In addition to the wheel equipped frame 25 the trolley 10 comprises hoisting means and also mechanism for propelling the trolley in either direction along the rails 9. The hoisting means is in the form of a hook equipped block 27, a cable 28, a rotatable hoist-drum 29, and a reversible electric motor 30. The cable is reeved through the hook equipped block and has its ends operatively connected to the drum 29. The latter is journalled on, and extends transversely across, the trolley frame 25 and is connected for drive by the electric motor 30 by way of speed reducing gearing 31. When the motor is driven in one direction the cable 28 is paid out and results in lowering of the hook equipped block. Reverse rotation of the motor serves to raise the block together with any load that is carried thereby, as well understood in the art. The hook equipped block 27 is located midway between the girders 8, as shown in Figure 4. The mechanism for propelling the truck along the rails 9 comprises a reversible electric motor 32 and speed reducing gearing 33 between the armature shaft of the motor and certain of the wheels 26. Wheel engaging stops 34 are located at the ends of the rails 9 and serve to prevent the trolley from being driven off the rails.

When it is desired to use the gantry crane while the airplane A is moored in the mooring basin B as shown in Figures 1, 2 and 3, the crane is shifted outwards along the ground rails 11 until the C-shaped legs 7 thereof are brought into straddled relation with the outer portions of the wing $a^1$ of the airplane. When the legs are brought into straddled relation with the wing of the airplane the trolley 10 overlies the wing and hence is usable to unload or load any of the storage compartments in the wing. By propelling the trolley back and forth along the rails 9 the trolley may be brought into overlying relation with any one of the storage compartments in the wing or a hatch closed opening in the upper central portion of the body or fuselage of the airplane A. The crane may be used not only to load or unload the airplane A but also as a servicing medium. For example, the crane may be used in connection with removal or replacement of the power units on the leading portions of the wing $a^1$. The herein described gantry crane, because of the arrangement and design of the legs 7, may be made extremely light in weight and is of minimum bulk as well as capable of being readily and easily handled. By having the legs spaced apart a materially less distance than the span of the wing of the airplane the crane as a whole is compact, occupies but a minimum amount of space, and is capable of being produced at a low and reasonable cost.

Whereas the crane has been described and illustrated in connection with an airplane of the flying boat type it is to be understood that it may be also used as a medium for servicing, loading and unloading land airplanes or other types of aircraft. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. A gantry crane designed for use in servicing, loading and unloading a wing equipped airplane and comprising a pair of upstanding laterally spaced C-shaped legs having open sided pockets therein shaped and adapted to receive and accommodate the outer portions of the wing of the airplane, an elongated horizontal track extending transversely of the legs, connected rigidly to the outer or free ends of the upper parts of said legs, and adapted to overlie, and extend lengthwise of, the airplane wing when the crane and airplane are in operative relation, and a trolley mounted on the track for travel therealong and provided with hoisting means.

2. A gantry crane designed for use in servicing, loading and unloading an airplane of the fixed high wing variety and comprising a pair of upstanding laterally spaced C-shaped legs having open sided pockets therein shaped and adapted to receive and accommodate the outer portions of the wing of the airplane, an elongated horizontal track extending transversely of the legs, connected rigidly to the outer or free ends of the upper parts of said legs, adapted to overlie, and extend lengthwise of, the airplane wing when the crane and airplane are in operative relation, and having the ends thereof projecting outwards of the legs, and a trolley mounted on the track for travel therealong and provided with hoisting means.

3. A gantry crane designed for use in servicing, loading and unloading a wing equipped airplane and comprising a pair of aligned upstanding C-shaped legs spaced apart a distance in excess of the width of the body of the airplane but less than the span of the airplane wing and having open sided pockets therein shaped and adapted to receive and accommodate the outer portions of said airplane wing, an overhead horizontal track extending transversely of the legs, connected rigidly to the upper parts of said legs, adapted to overlie, and extend lengthwise of, the airplane wing when the crane and airplane are in operative relation, and having the ends thereof projecting outwards of said legs, and a wheel equipped trolley mounted on the track for travel therealong and provided with hoisting means.

4. A crane structure designed for use in servicing, loading and unloading a wing equipped airplane and comprising a pair of parallel ground rails spaced laterally apart a sufficient distance so that the airplane in connection with a servicing, loading or unloading operation may be manipulated into a position wherein the body thereof is disposed between, and extends lengthwise of, the rails, and a gantry crane mounted on the ground rails so that it is movable to and from the airplane when the latter is in said position and embodying a pair of horizontally aligned upstanding C-shaped legs positioned above the rails, respectively, provided at the lower parts thereof with rail engaging wheels and adapted when the airplane is in said position and the crane is shifted towards the airplane to straddle the outer portions of the wing of the airplane, an elongated horizontal track extending transversely of the legs and rails and carried by the upper parts of said legs so as to overlie the airplane wing when the crane is shifted so that the legs are in straddled relation with said outer portions of the airplane wing, and a trolley mounted on the track for travel therealong and provided with hoisting means.

5. A crane structure designed for use in servicing, loading and unloading a wing equipped airplane and comprising a pair of parallel ground rails spaced laterally apart a sufficient distance so that the airplane in connection with a servicing, loading or unloading operation may be manipulated into a position wherein the body thereof is disposed between, and extends lengthwise of, the rails, and a gantry crane mounted on the ground rails so that it is movable to and from the airplane when the latter is in said position and embodying a pair of horizontally aligned upstanding C-shaped legs positioned above the rails, respectively, provided at the lower parts thereof with rail engaging wheels and adapted when the airplane is in said position and the crane is shifted towards the airplane to straddle the outer portions of the wing of the airplane, an overhead horizontal track extending transversely of the legs and ground rails, carried by the outer or free ends of the upper parts of said legs so as to overlie, and extend lengthwise of, the airplane wing when the crane is shifted so as to bring the legs into said straddled position with respect to the outer portions of the airplane wing, and having the ends thereof projecting outwards of said legs, and a trolley mounted on the track for travel therealong and provided with hoisting means.

6. A gantry crane designed for use in servicing, loading and unloading a wing equipped airplane and comprising a pair of upstanding laterally spaced C-shaped legs having open sided pockets therein shaped and adapted to receive and accommodate the outer portions of the wing of the airplane, each of the legs having in the upper portion of the outer or free end of its upper part a pair of notches spaced apart longitudinally of said upper part, a pair of parallel laterally spaced horizontal girders extending transversely of the upper parts of the legs and having the portions thereof inwards of their ends mounted in said notches, a pair of rails mounted on, and extending lengthwise of, the upper portions of the girders, and a wheel equipped trolley mounted on the rails to travel back and forth therealong and provided with hoisting means.

7. A gantry crane comprising a pair of upstanding horizontally aligned C-shaped legs, each consisting of a pair of similar and aligned C-shaped plates and spacing strips between the marginal portion of the plates, an overhead horizontal track extending transversely of the legs and carried by the upper parts of said legs, and a trolley mounted on the track for travel therealong and provided with hoisting means.

ARTHUR J. BROWN.